United States Patent

[11] 3,614,127

| [72] | Inventor | Patrick M. Glance |
| | | Plymouth, Mich. |
| [21] | Appl. No. | 867,476 |
| [22] | Filed | Oct. 20, 1969 |
| [45] | Patented | Oct. 19, 1971 |
| [73] | Assignee | Ford Motor Company |
| | | Dearborn, Mich. |

[54] VARIABLE PRESSURE AIR BAG RESTRAINT DEVICE
3 Claims, 2 Drawing Figs.

[52] U.S. Cl. .................................................. 280/150 AB
[51] Int. Cl. .................................................. B60r 21/08
[50] Field of Search ........................................ 280/150
AB; 52/2; 244/137; 193/25 B

[56] References Cited
UNITED STATES PATENTS
2,418,798  4/1968  Whitmer ..................... 280/150 AB 3,433,470  3/1969  Erke ............................. 52/2
3,451,694  6/1969  Hass ............................. 280/150 AB
3,473,824  10/1969  Carey et al ................... 280/150 AB

*Primary Examiner*—Benjamin Hersh
*Assistant Examiner*—John A. Pekar
*Attorneys*—John R. Faulkner and E. Dennis O'Connor ABSTRACT: A variable pressure air bag restraint device adapted to be positioned in a motor vehicle passenger compartment forward of a passenger to be restrained. Remote from the passenger, the interior of the bag is connected to a source of pressurized gas capable of inflating the bag. With the bag in the inflated condition, separating walls divide the bag interior into a plurality of compartments that extend progressively between the gas source and the passenger. The compartments are interconnected by orifices in the walls. The size of each one of these orifices varies inversely with the distance between each orifice and the gas source.

PATENTED OCT 19 1971

3,614,127

INVENTOR.
Patrick M. Glance
BY John R. Faulkner
E. Dennis Connor
ATTORNEYS

VARIABLE PRESSURE AIR BAG RESTRAINT DEVICE

BACKGROUND OF THE INVENTION

Passenger restraint air bags adapted for utilization in motor vehicle passenger compartments to restrain forward movement of a vehicle passenger are well known in the art. An example of a so-called "dynamic" air bag may be seen in U.S. Pat. No. 3,451,693, issued June 24, 1960. The term "dynamic" is applied to such an arrangement because the bag normally is deflated and becomes inflated in response to some external stimulus such as rapid vehicle deceleration. The term "air bag" has gained acceptance in the art to define an inflatable confinement of this type, although it is recognized that gases other than air may be used for inflation purposes.

Undesirable conditions attendant the sudden inflation of dynamic air bags may occur as a high-pressure gas suddenly is admitted to the interior of the bag. Slow motion moving picture studies have shown that the high-pressure gas tends to rush through the bag interior to the extremity of the bag located most remote from the gas inlet opening and gas source and most proximate to the passenger. Subsequent to the full inflation of this bag extremity, the central portion of the bag becomes inflated.

The air flow resulting in this type of bag inflation may be quite violent. Also, the bag extremity initially inflated is the bag portion impacted by the passenger to be restrained. This initial inflation may produce such a high pressure in this bag extremity that the passenger is not cushioned to the extent desired upon impact with the bag.

An object of this invention is to provide an air bag restraint device including a flexible, inflatable air bag that suddenly may be inflated by pressurized gas in a controlled manner. The inflation of this air bag is such that the pressure in the air bag portion proximate the passenger is limited to a relatively low level, thereby insuring adequate cushioning of the passenger at the time of impact between the passenger and the bag. Other objects and advantages of this invention will become apparent as the following discussion and description of the invention proceeds.

SUMMARY OF THE INVENTION

An air bag restraint device according to this invention is adapted for use in a motor vehicle to restrain movement of a vehicle passenger. The restraint device includes a flexible air bag adapted to be inflated. The air bag is positioned in a vehicle passenger compartment forward of the passenger. A source of pressurized gas is interconnected with the interior of the air bag and a gas input location on the bag that is remote from the passenger. Divider means located within the air bag separate the bag interior space into a plurality of compartments arranged when the bag is inflated in side-by-side positions between the gas input location and the passenger. Orifice means are formed through the divider means and interconnect each of the compartments with at least one other of the compartments. The size of each of the orifice means varies inversely with the distance of each orifice means from the gas input location.

DETAILED DESCRIPTION OF THE INVENTION

Figure 1:
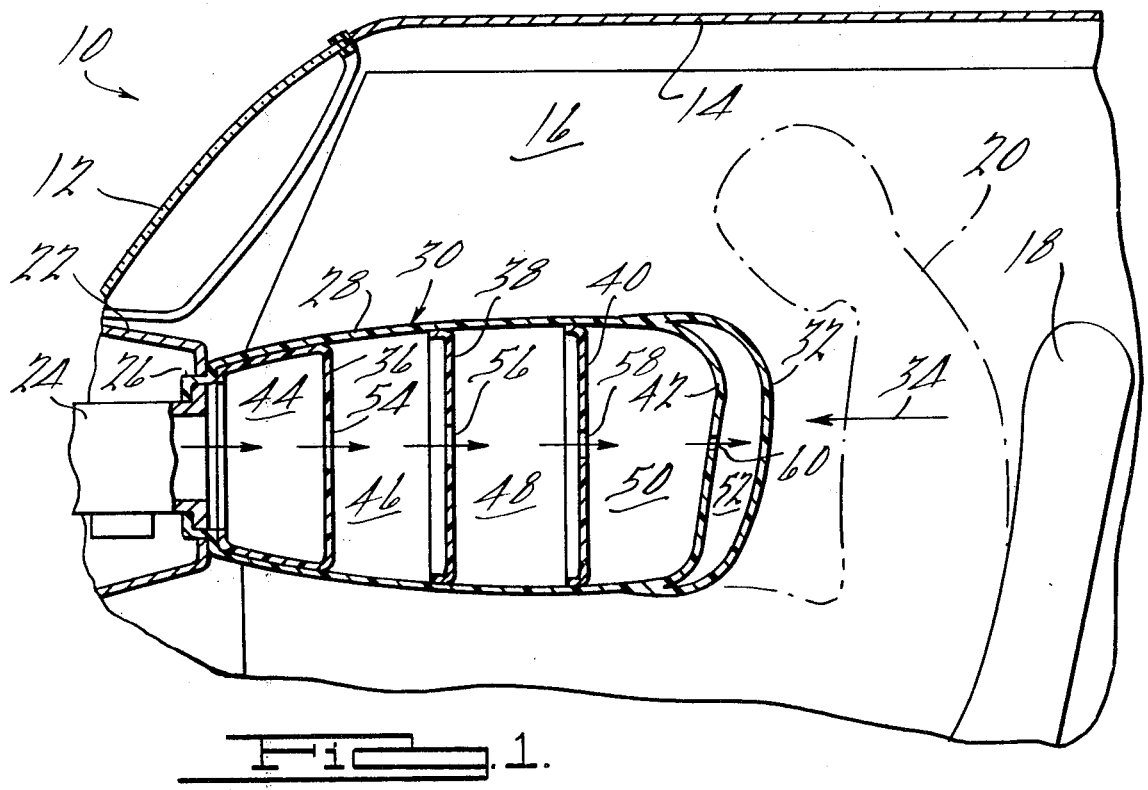
FIG. 1 is a side elevation view, with parts in section and parts shown schematically, of a motor vehicle passenger compartment including the air bag restraint device of this invention.

Referring now in detail to the drawing and in particular to FIG. 1, the numeral 10 denotes generally a portion of a motor vehicle having body structure including a windshield 12 and a roof 14 partially defining a passenger compartment 16. A forward facing seat 18 is located within the passenger compartment 16 and is adapted to support a passenger 20.

Forward of the passenger 20, a dash panel 22 mounts a source 24 of pressurized gas. This source of pressurized gas may be any suitable means known in the art and capable of releasing a predetermined amount of pressurized gas substantially instantaneously in response to an external stimulus such as rapid vehicle deceleration. Examples of sources of pressurized gas suitable for use in conjunction with this invention may be found disclosed by U.S. Pat. No. 3,451,693 identified above and U.S. Pat. No. 3,460,853, issued Aug. 12, 1969.

The source 24 of pressurized gas has a projection 26 extending therefrom to which is secured, as by adhesive or other suitable bonding means, the outer skin 28 of an inflatable confinement or air bag 30. In FIG. 1, the air bag 30 is shown in its inflated position with air bag out skin portion 32 being located remote from the source 24 of pressurized gas and proximate to the passenger 20. It is air bag portion 32 that will be impacted by passenger 20 when the passenger is restrained from excessive forward movement by the presence of the bag 30. This movement of passenger 20, as may occur during rapid vehicle deceleration such as during a vehicle collision, is represented by the arrow 34.

Positioned within the interior of an air bag 30 are a plurality of internal walls or dividers 36, 38, 40 and 42. These dividers separate the interior of the air bag 30 into five chambers 44, 46, 48, 50 and 52 that are positioned progressively outward from the source 24 of pressurized gas towards the passenger 20. Dividers 36, 38, 40 and 42 have formed therethrough orifices 54, 56, 58 and 60 respectively. The size of each of these orifices varies inversely with the distance of the orifice from the source 24 of pressurized gas with orifice 54 being the largest in size and orifice 60 being the smallest.

The construction of air bag 30 as described above allows for the inflation of this bag by gas from source 24 of pressurized gas in a controlled and nonviolent manner. It readily may be appreciated that normally air bag 30 is in a folded condition and is located proximate the instrument panel 22. The response to an external stimulus, gas from the conventional pressurized gas source 24 suddenly releases a volume of pressurized gas that rushes unimpeded into chamber 44, pressurizing and inflating this chamber. During the pressurization of chamber 44, a portion of the gas from gas source 24 passes through orifice 54 to chamber 46. The flow of gas from chamber 44 to chamber 46 is, of course, restricted by the presence of dividers 36 and controlled by the size of the orifice 54 formed through divider 36. It thus readily may be appreciated that at any given instant in time during the inflation of bag 30, chamber 46 will be at a lower pressure than chamber 44. The same may be said of chamber 48 relative to chamber 46 and so on, such that chamber 52, located in the most remote position relative to the pressurized gas source 24 and accessible only through the most restricted orifice 60, is last of the bag chambers to be inflated and, at any point in time, is at the lowest pressure during bag inflation.

Figure 2:
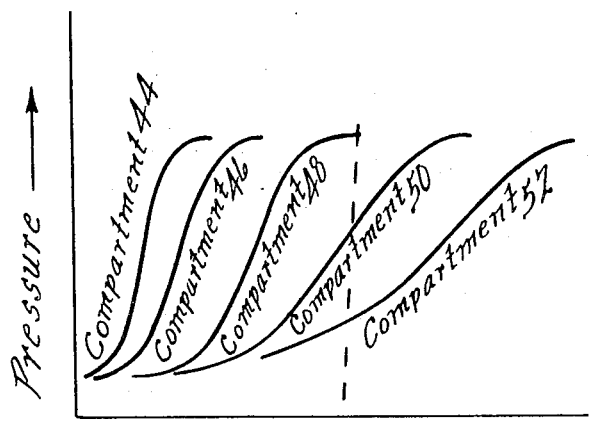
FIG. 2 is a plot, with the abscissa being time and the ordinate being pressure, of the pressurization of the various compartments of the air bag restraint device illustrated in FIG. 1.

This progressive inflation of bag 30 is represented by the plots shown in FIG. 2 of the drawing. It may be seen that the compartments 44, 46, 48, 50 and 52 progressively are inflated as time passes. The dotted line in FIG. 2 is illustrative of an assumed instant of occupant impact with portion 32 of bag 20. This point in time has been chosen arbitrarily but readily may be controlled relative to the inflation of bag 30 by selection of the sizes of the orifices formed through the divider walls.

It may be seen that at the time of impact, compartments 44, 46 and 48 are fully inflated while compartment 50 is inflated to about one-half of its maximum pressure and compartment 52 is only beginning to be inflated and is at a low pressure. This low pressure in compartment 52 provides for adequate cushioning of passenger 20 as the passenger impacts against bag portion 32 that partially defines compartment 52.

The low pressure of compartment 52 also provides for a relatively large deformation of this compartment due to impact by the passenger. As the passenger deforms compartment 52 to the left, as viewed in FIG. 1, portion 32 of bag 30 tends to wrap around the sides of the passenger and prevent the passenger from "rolling off" the bag—an undesirable occurrence.

It thus may be seen that this invention provides a variable pressure air bag restraint device that includes an air bag divided into compartments that progressively are inflated in a controlled manner such that certain compartments are at different pressures at the time of impact between the vehicle passenger to be restrained and the air bag. The controlling of the inflation of the air bag also functions to prevent an undesirable and violent air bag inflation movement within the vehicle passenger compartment.

I claim:

1. An air bag restraint device adapted for use in a motor vehicle to restrain movement of a vehicle passenger, said restraint device including:

a flexible bag positioned within the vehicle in a normally deflated condition spaced from said vehicle passenger;

a pressurizing means interconnected with the interior of said bag at a gas input location positioned on a rear side of said restraint bag away from said vehicle passenger, said pressurizing means for forcing pressurized gas into said bag to urge said bag from said deflated condition to an inflated condition wherein a forward side of said bag is engaged by said vehicle passenger for restraint purposes;

a plurality of internal walls within said bag extending across said bag in planes generally parallel with said forward side of said bag when in its inflated condition, said internal walls dividing said bag into a plurality of chambers which are spaced in a sequence one in front of the next from said pressurizing means input location to said restrain passenger engaged by said bag; and gas flow control means in each of said plurality of internal walls for controlling the rate of inflation of each of said chambers so that during inflation the pressurizing of each chamber is progressive with the chamber closest to said pressurizing means input location being the first to be fully pressurized and with the chamber closest to said restrained passenger being the last to be fully pressurized the said chambers between said two chambers being fully pressurized in sequence.

2. The air bag restraint device of claim 1 wherein: said gas flow control means comprises a plurality of orifices formed in said internal walls, one orifice being formed in each of said internal walls.

3. The air bag restraint device of claim 2 wherein: the size of each of said orifices decreases with the distance of each of said orifices from said input location of said pressurizing means when said bag is in an inflated condition.